US010074277B2

(12) United States Patent
Mayer et al.

(10) Patent No.: US 10,074,277 B2
(45) Date of Patent: *Sep. 11, 2018

(54) METHOD FOR ASCERTAINING A PARKING AREA OF A STREET SECTION

(71) Applicant: Robert Bosch GmbH, Stuttgart (DE)

(72) Inventors: Philipp Mayer, Stuttgart (DE); Peter Christian Abeling, Hannover (DE); Thorben Schick, Hardegsen (DE); Carlos Cunha, Palo Alto, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,541

(22) Filed: Jan. 6, 2017

(65) Prior Publication Data
US 2017/0116859 A1 Apr. 27, 2017

Related U.S. Application Data

(63) Continuation of application No. 14/852,089, filed on Sep. 11, 2015, now Pat. No. 9,542,845.

(51) Int. Cl.
G01S 17/08 (2006.01)
G01S 13/08 (2006.01)
G01S 15/08 (2006.01)
G08G 1/14 (2006.01)

(52) U.S. Cl.
CPC ............... *G08G 1/14* (2013.01); *G01S 13/08* (2013.01); *G01S 15/08* (2013.01)

(58) Field of Classification Search
CPC ............ G08G 1/14; G01S 13/08; G01S 15/08
See application file for complete search history.

(56) References Cited

U.S. PATENT DOCUMENTS 7,739,046 B2   6/2010   Satonaka
2014/0085112 A1   3/2014   Gruteser

FOREIGN PATENT DOCUMENTS

| DE | 102004062021 A1 | 7/2006 |
| DE | 102008028550 A1 | 12/2009 |
| DE | 102009028024 A1 | 2/2011 |
| JP | 4705259 B2 | 6/2011 |
| JP | 4741394 B2 | 8/2011 |

Primary Examiner — Michael J Zanelli
(74) Attorney, Agent, or Firm — Gerard Messina

(57) ABSTRACT

A method for ascertaining a parking area of at least one street section includes providing information indicating a usable width of the street section, the usable width representing a drivable width of the street section between spaces for parked vehicles at the two lateral sides of a driving vehicle; the driving vehicle driving the street section and ascertaining lateral distances from objects using an ascertainment device situated in the driving vehicle; comparing the ascertained lateral distances to the usable width; and ascertaining the parking area by way of the comparison.

24 Claims, 5 Drawing Sheets

METHOD FOR ASCERTAINING A PARKING AREA OF A STREET SECTION

CROSS-REFERENCE TO RELATED APPLICATIONS

The present application is a continuation of and claims priority to U.S. patent application Ser. No. 14/852,089, filed Sep. 11, 2015, the content of which is hereby incorporated herein by reference in its entirety.

FIELD OF THE INVENTION

The present invention relates to a method for ascertaining a parking area of at least one street section. The present invention further relates to a device for ascertaining a parking area of at least one street section.

BACKGROUND

Various methods are known in the related art for ascertaining distances of a vehicle from objects with the aid of distance-based sensors (e.g., ultrasonic sensors, radar sensors, video sensors, lidar sensors).

A transmission of parking space data to a server is known for example from DE 10 2004 062 021 A1, DE 10 2009 028 024 A1 and DE 10 2008 028 550 A1.

SUMMARY

An objective of the present invention is to provide an improved method for ascertaining a parking area of a street section.

According to an example embodiment, the objective is attained by a method for ascertaining a parking area of at least one street section including the steps of: providing a usable width of a street section, the usable width representing a drivable width of the street section between parked vehicles; driving the street section using an ascertaining vehicle and ascertaining lateral distances from objects using an ascertainment device situated in the ascertaining vehicle; comparing the ascertained lateral distances to the usable width; and ascertaining the parking area by way of the comparison.

The method may be used advantageously especially for completing incomplete parking space maps. If the measured usable width (between vehicles at both sides of the driving vehicle) coincides with the known, i.e., expected, usable width, an inference is made that the parking area is occupied. Ultimately, this makes it possible to use parked vehicles to detect parking areas, whereby known methods based exclusively on detecting parking spaces are significantly improved.

On account of the information regarding the usable width of the street section, it is possible advantageously to ascertain parking areas and to provide these for example in the form of a parking space map. This allows for parking areas to be learned quickly, as a result of which it becomes possible to prepare a complete and current parking space map using a relatively small number of passes.

In an example, the method is further characterized by that, in the event of a defined deviation of the ascertained lateral distances from the usable width, which initially indicates an apparent parking area, but which apparent parking area is determined because of a vehicle parked in a second row of the street section (within the usable width), the apparent parking area is discarded. It is thus possible to filter out detected "false" parking areas so that these do not enter the parking space map.

In an example, the method is further characterized by that, in the event of a defined deviation of the ascertained lateral distances from the usable width, an apparent parking area ascertained on the basis of a vehicle of oncoming traffic is discarded. Even in the event of oncoming traffic, it is thus possible to filter out a "false" parking area detected on the basis of the detection mechanism, which is therefore not entered in the parking space map. Ultimately, a type of "deplausibilization of parking space" is thus provided, which is advantageously functional even when the usable width is not represented between vehicles parked on the edges of the street.

In an example, the method further provides for a maximum usable width of the street section to have the following value: 2×the maximum range of the ascertainment device+ width of the ascertaining vehicle. This makes it possible to take the ranges of different sensor technologies into account such as e.g., ultrasound, radar, laser, etc. In the event that the sensor technology used does not reach the mentioned range, additional localization methods may be used, e.g., using GPS data.

In an example, the method further provides for a position of the vehicle to be detected in the event that a range of the ascertainment device does not cover the entire usable width, the detected position being compared to the ascertained lateral distances. In this manner, the proper functionality of the method is ensured even when the usable width of the street section exceeds the sensor range.

In an example, the method further provides for ascertaining objects, in particular vehicles, from the ascertained distance values. Objects, in particular vehicles, are thereby detected from the ascertained distances, which are determined from defined echoes of the ascertainment device. Other objects, e.g., advertisement pillars, garbage containers etc., may also be detected, which do not enter the parking space map.

Ultimately, this makes it possible to prepare a parking area map quickly and efficiently.

In an example, the method further provides for the method to be carried out at least partly locally in the ascertaining vehicle and/or at least partly in a server facility. In this manner, an existing processing capacity may be distributed or utilized in the best way possible.

In an example, the method further provides for the ascertained distance data to be transmitted to the server facility in an automated fashion. This makes it possible to aggregate in the long term a great quantity of historical data, which represent the conditions in a very current and accurate fashion.

In an example, the method further provides for the method to be carried out in real time while the street section is driven or just after the street section is driven in an evaluation phase. This makes it possible advantageously to implement different evaluation strategies.

In an example, the method further provides for the street section to be driven in different directions of travel, the ascertainment data of the drives in the different directions of travel being correlated. Driving the street section in opposite directions advantageously allows for an even more precise ascertainment of the parking area.

In an example, the method is further characterized by that parking areas are ascertained for a defined length of the street section. This makes it possible to produce parking space maps for selectively chosen areas.

According to an example embodiment, the objective is attained by a device for ascertaining a parking area of a street section, the device including an ascertaining vehicle equipped with an ascertainment device, it being possible to ascertain lateral distances using the ascertainment device, a usable width of the street section being known to the device, and a parking area being ascertainable from a comparison of the ascertained lateral distances with the usable width.

The present invention is described below in detail with additional features and advantages, with reference to several figures. For this purpose, each and every of the features presented in any of the specification, drawings, and claims form the subject matter of the present invention. The figures are specifically intended to illustrate the principles that are essential to an understanding of the present invention.

DETAILED DESCRIPTION

In the sense of the present invention, a so-called "usable width" or "drivable driving width" or "drivable driving lane" or "real street width" of a street or a section of a street defines a physical width of the street from curb to curb minus a respective width of a parked vehicle on each edge of the street. It is thus assumed that the usable width is defined only in those areas of the street that are bounded by parking areas. For this purpose, the usable width is ascertained by a pre-filtering process, in which e.g., the walls of buildings are not taken into account as limiting elements of the street section for ascertaining the usable width.

Conventionally, to ascertain the usable width, specific reflection patterns of alternating vehicles and parking spaces are normally used. The ascertainment of the mentioned parking spaces is in this instance bound up with a detection of characteristic echo images, it being necessary, e.g., for there to exist respectively a sequence of [parked vehicle—parking space] or [parking space—parked vehicle] in order to detect the parking space. This requires an extensive number of drives through the street section, it being very difficult to ascertain or verify areas, which are subject to great parking pressure and which are consequently very seldom or never free, as a parking area.

Figure 1:
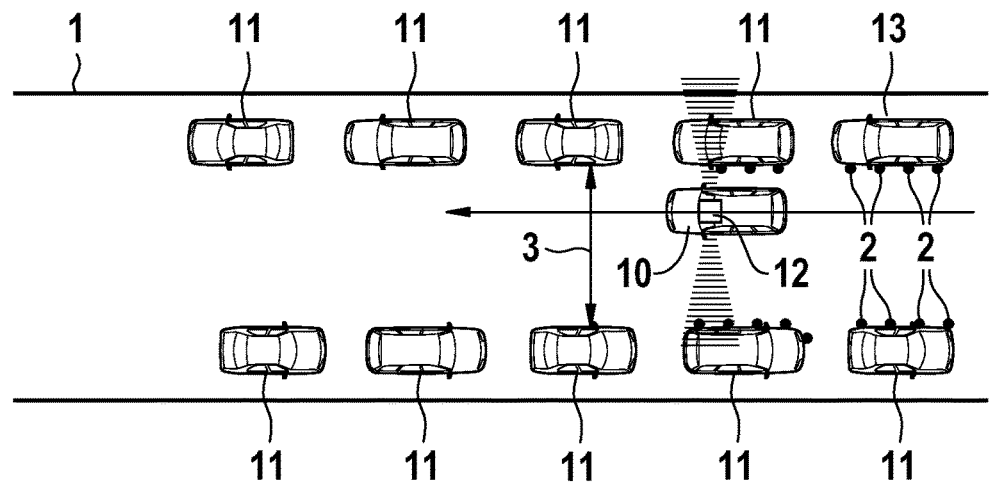
FIG. 1 is a diagrammatic sketch for explaining a functional principle of the method, according to an example embodiment of the present invention.

FIG. 1 shows a fundamental functional principle of method for ascertaining a parking area of a street section, according to an example embodiment of the present invention. An ascertaining vehicle 10 is shown, which drives along a street section 1 in the direction of the arrow. On both edges of street section 1, parked vehicles are shown, which occupy parking areas 13 (covered by vehicles 11) of street section 1. Ascertaining vehicle 10 includes an ascertainment device 12 for detecting a distance from objects situated laterally with respect to the direction of travel, ascertainment device 12 including an ultrasonic sensor, a radar sensor or another suitable sensor.

As already mentioned, ascertainment device 12 has advance information regarding a usable width 3 of the street section 1, a manner of ascertaining the usable width 3 and a manner of providing the usable width 3 being ultimately of secondary importance for ascertainment device 12. Ascertainment device 12 furthermore has information regarding that street section 1 has parking areas 13 at least on one side.

When street section 1 is driven, an example embodiment of the present invention provides for the detection of distances from objects, preferably vehicles 11, situated laterally from ascertaining vehicle 10, and for comparing these with known usable width 3. In this manner, as many lateral distances as possible are detected between ascertaining vehicle 10 and parked vehicles 11, at least one measurement being performed laterally essentially at a right angle on the left and on the right of ascertaining vehicle 10. The mentioned ascertainments are ultimately available in the form of limit points 2 of usable width 3, which thus represent "scanning points" of usable width 3. Because of tolerance thresholds, usable width 3 is represented by an arithmetic average value of distances between limit points 2.

In the event that, as shown in FIG. 1, the measured distance within the scope of a defined tolerance threshold (due to measurement or parking inaccuracies) essentially agrees with the previously known usable width 3, an inference is made to the effect that parking areas 13 along street section 1 are occupied. In this manner, it is possible to prepare a complete parking space map within a short time, since, unlike in the related art, it is not necessary that there be unoccupied parking areas 13 ("parking spaces") in order to detect parking areas 13.

Figure 2:
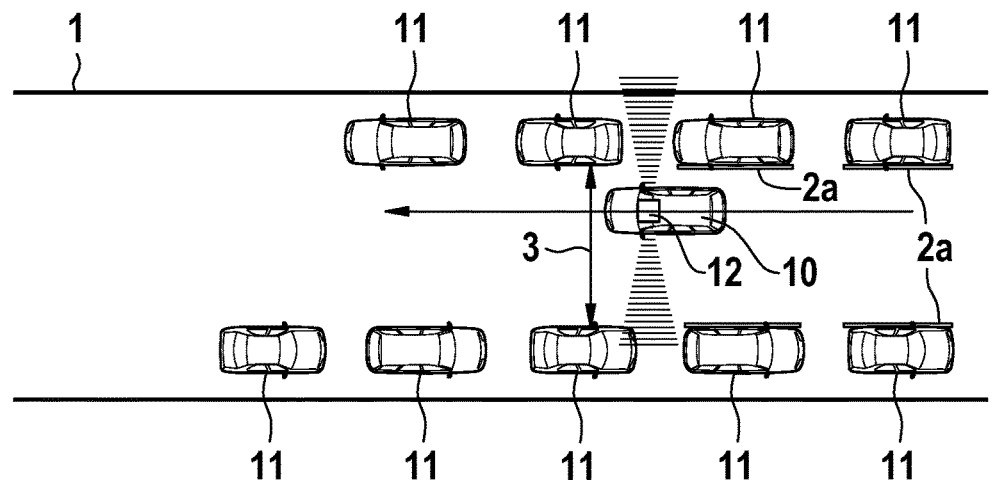
FIG. 2 is a diagrammatic sketch for explaining an advantageous development of the method, according to an example embodiment of the present invention.

FIG. 2 shows a principle of an advantageous development of the method. In this instance, objects, preferably in the form of vehicles 11, are ascertained or modeled from the measured lateral distance values by way of a processing step, which is indicated by tangential limit lines 2a on those vehicles 11 which ascertaining vehicle 10 has already passed. In this case as well, usable width 3 is compared to the distances between ascertained vehicles 11, and from this it is possible to infer parking areas 13.

Figure 3:
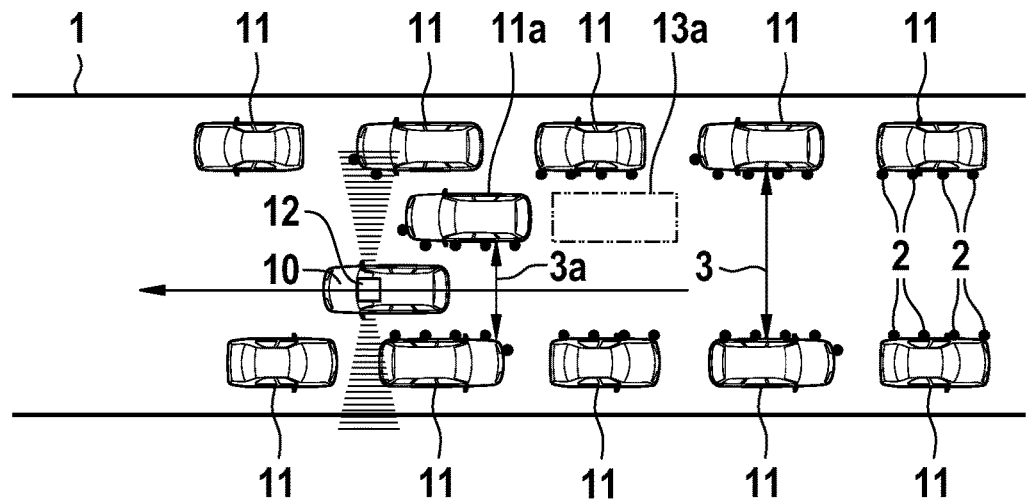
FIG. 3 is a diagrammatic sketch for explaining a deplausibilization of an apparent parking area due to a vehicle in the second lane, according to an example embodiment of the present invention.

FIG. 3 indicates a principle of a deplausibilization of a "false parking area" 13a, which is detected in a space behind a vehicle 11a that is parked in a second row and which is discarded for the purpose of preparing the parking space map. To detect a free parking area 13, ascertainment device 12 requires at least one object before or after free parking space 13 in order to generate a signal transition. This can be achieved when there is a clear difference between a currently measured usable width 3a between vehicle 11a parked in the second row and the opposite vehicle 11 and the previously known usable width 3. In this instance as well, there is thus a comparison between the currently measured usable width 3a and the previously known usable width 3, whereby a false parking space is discarded, tagged or otherwise marked as invalid and is thus not taken up into the parking space map.

Figure 4:
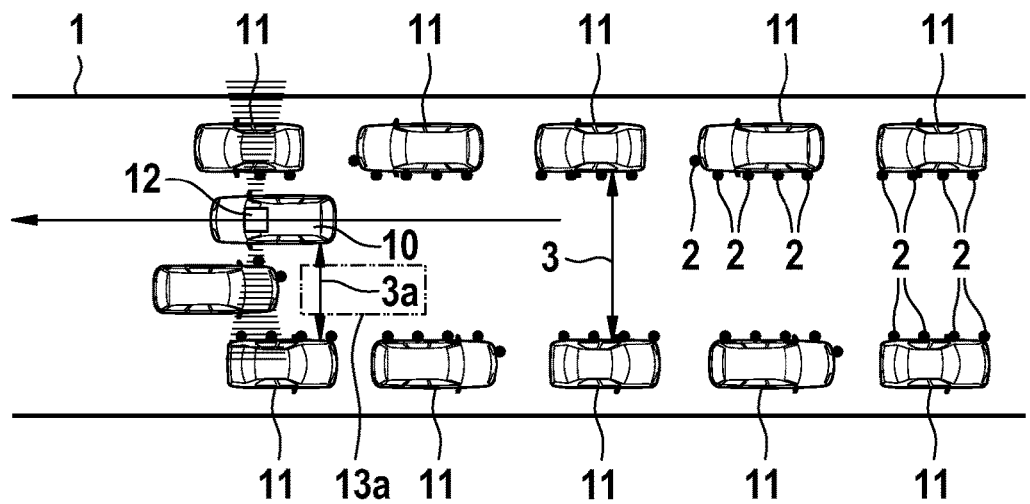
FIGS. 4 and 5 are diagrammatic sketches for explaining a deplausibilization of an apparent parking area as a result of oncoming traffic, according to an example embodiment of the present invention.

As indicated in FIG. 4, this may be done analogously also in the case of an individual vehicle of oncoming traffic, the individual vehicle of oncoming traffic and the ascertaining vehicle 10 driving past each other at a defined low relative speed (e.g., approximately 45 km/h). The mentioned relative speed can be determined or adapted in a simple manner using suitable software algorithms. In this case too, there is no detection of a false parking area 13a, which is thus discarded and does not enter into the parking space map.

Figure 5:
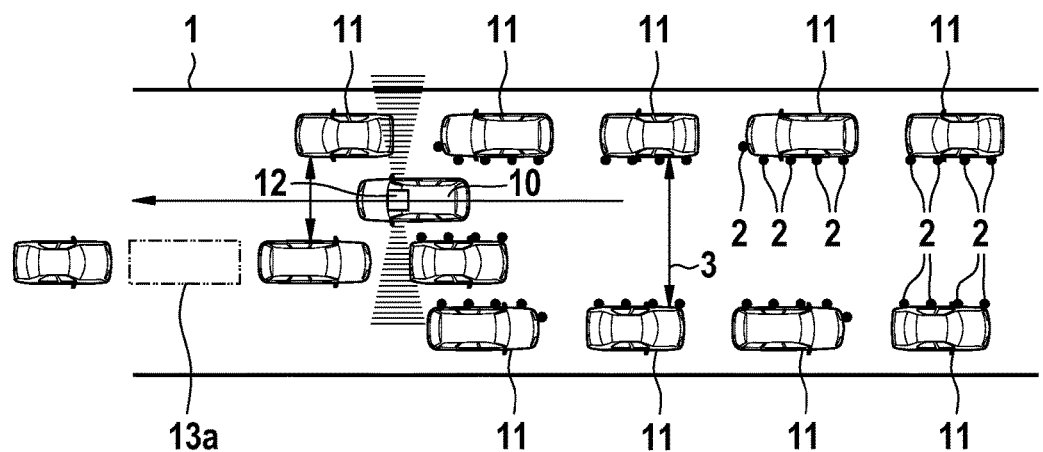

FIG. 5 essentially corresponds to FIG. 4, a scenario being represented in this case with moving oncoming traffic, in which a larger space occurs between two individual vehicles of the oncoming traffic, which is recognized as a false parking area 13a and is discarded or deplausibilized for the purpose of producing the parking space map.

Figure 6:
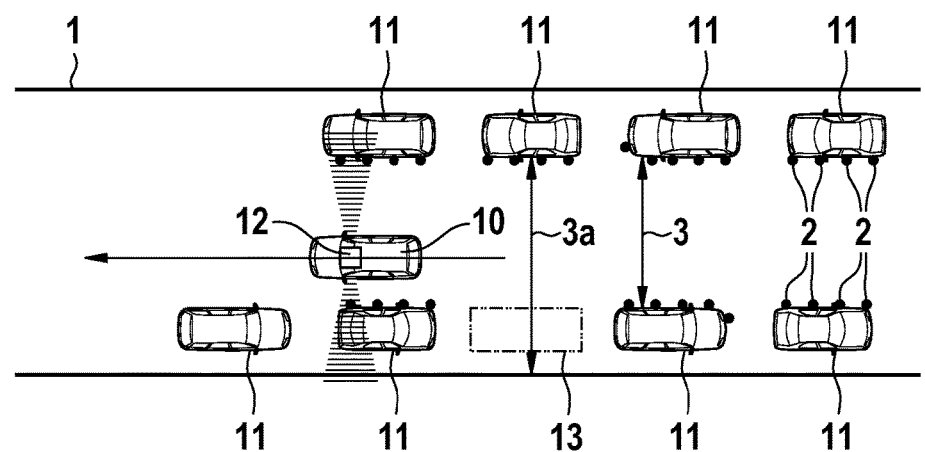
FIG. 6 is a diagrammatic sketch for explaining a recognition of a parking area, according to an example embodiment of the present invention.

FIG. 6 shows a "positive comparison" between known usable width 3 and the currently measured usable width 3a, the currently measured usable width 3a being greater than the known usable width 3, and for this reason a parking area 13 being recognized or validated.

Figure 7:
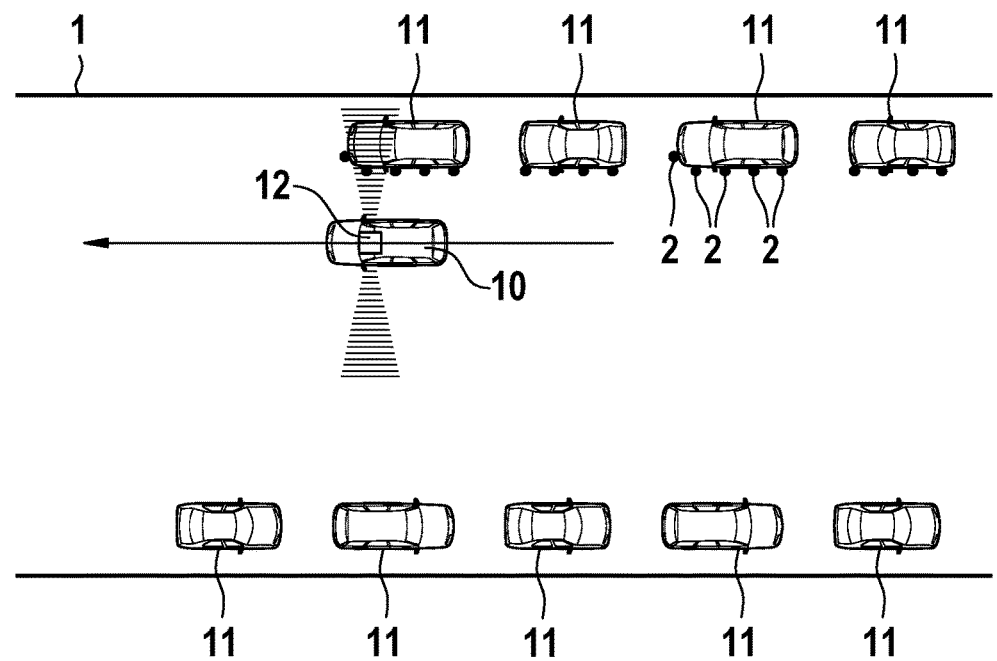
FIGS. 7 and 8 are diagrammatic sketches for explaining a sensor range, according to an example embodiment of the present invention.

FIG. 7 shows a scenario, in which a range of ascertainment device 12 on the left side of ascertaining vehicle 10 is not sufficient for ascertaining the distances from vehicles 11. Using ascertainment device 12, it is thus possible to ascertain only the limit points 2 to the right of ascertaining vehicle 10. In this case, it is possible to use additionally a position detection device (e.g., a GPS position detection device) in order to determine a position of ascertaining vehicle 10 that is accurate to within the centimeter range, and to ascertain in this manner distances from the laterally situated vehicles 11. The following equation applies for the maximum setpoint range $d_{max}$ of ascertainment device 12: $d_{max}$=2×maximum sensor range+width of the ascertaining vehicle If ascertainment device 12 is unable to reach the stated setpoint range $d_{max}$, then no comparison can be performed with the previously known usable width 3, and the mentioned position detection device must be used additionally.

Figure 8:
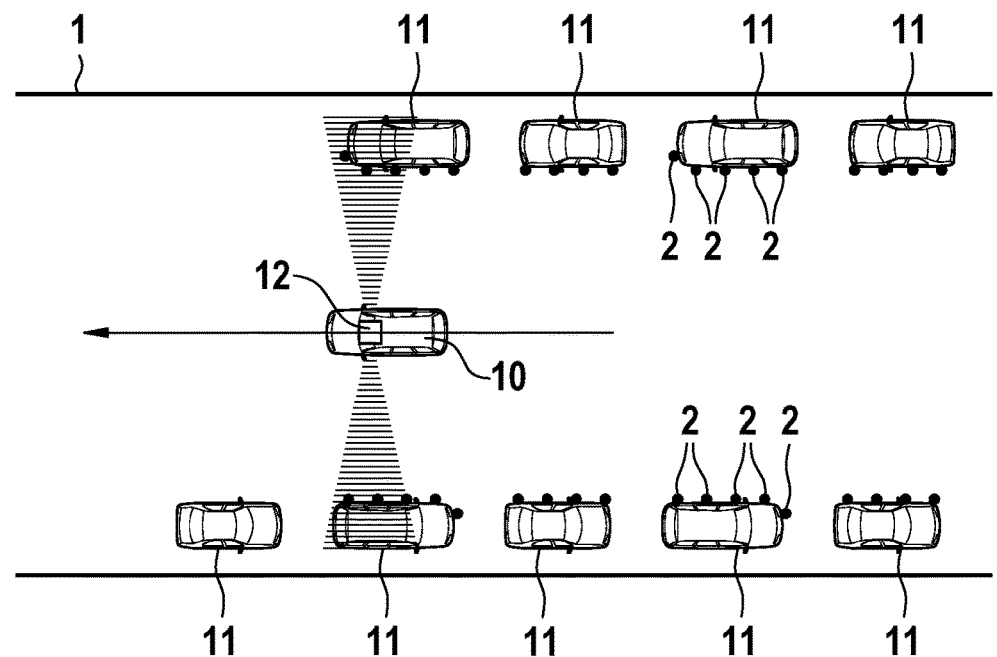

FIG. 8 indicates that a range of ascertainment device 12 is increased with the aid of another sensor technology in order thereby to be able to perform the lateral measurements. In this manner, as provided, it is possible to ascertain the limit points 2 on both sides of ascertaining vehicle 10. Depending on the sensor technology utilized in ascertainment device 12, a different sensor range of ascertainment device 12 may be utilized, whereby different usable widths 3 may be ascertained depending on the utilized technology.

The mentioned ascertainments of the lateral distances with the ascertainment of parking areas 13 and the deplausibilization of false parking areas 13a can be performed locally in ascertainment device 12 and/or in a decentralized server facility (not shown). Real-time processing can be provided or processing can be performed subsequent to drives along the street section. A communication device required for processing in the server facility for wired or wireless communication of ascertainment device 12 with the server facility is not shown.

The accuracy and reliability of the ascertainment of parking areas 13 increases with the number of drives through the respective street section 1 since averaging is then performed with an increased number of measured values.

Advantageously, the ascertainment of parking area 13 can already be performed in ascertaining vehicle 10 itself, for example by ascertainment device 12 or a control unit provided for this purpose. Alternatively or additionally, it is also conceivable that all acquired data are transmitted via a radio-based communication device (e.g., based on GSM, EDGE, UMTS, LTE, WLAN etc.) of the ascertaining vehicle 10 to a server facility, the ascertainment of parking area 13 in this case being performed by the server facility, which is normally significantly more powerful.

Preferably, there can be a provision to ascertain parking areas 13 over a freely definable street section 1.

Preferably, there can also be a provision to perform the described measurements also in a second direction of travel of street section 1 and to correlate or compare them with the measured values of the drive through street section 1 performed in the first direction of travel (not shown). In this manner, it is possible to improve further a data quality of parking areas 13 or an accuracy of the parking space map produced from these.

The method can be implemented advantageously using different sensor technologies, e.g., ultrasonic sensors or radar sensors, which makes it possible to take economic aspects into account.

The method is preferably implemented as software, which facilitates adapting and updating the method.

Figure 9:
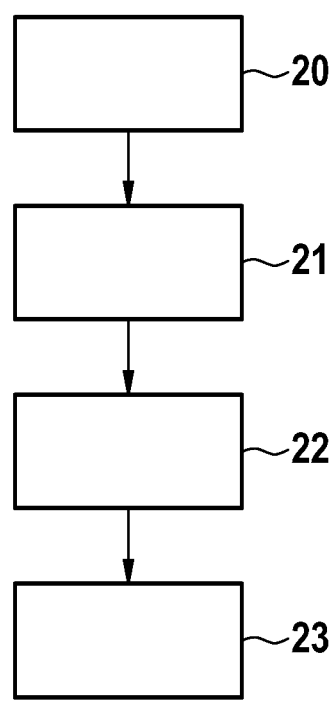
FIG. 9 is a flowchart of a method according to an example embodiment of the present invention.

FIG. 9 shows a basic flowchart of an example embodiment of the method of the present invention. In a step 20, a usable width 3 of street section 1 is provided, the usable width 3 representing a drivable width of street section 1 between parked vehicles 11. In a step 21, street section 1 is driven by an ascertaining vehicle 10 and lateral distances from objects are ascertained by an ascertainment device 12 situated in ascertaining vehicle 10. In a step 22, the ascertained lateral distances are compared to usable width 3. Parking area 13 is ascertained by way of the comparison in a step 23.

In summary, the present invention provides a method and a device for ascertaining a parking area of a street section. A type of "data mining" is performed for this purpose, which while driving carries out a continual comparison of an ascertained usable width with a previously known usable width. Ultimately, this makes it possible to produce parking space maps of high quality in an efficient manner. Advantageously, for recognizing the parking areas, it is possible to use also parking areas that are in an occupied state, and it is not necessary for parking areas to be unoccupied in order to be detected.

Although the present invention was described above with reference to specific example embodiments, one skilled in the art is also able to implement specific embodiments that were not disclosed above or that were disclosed above only partially, without deviating from the essence of the invention.

What is claimed is:

1. A method for ascertaining a parking area of a street section, the method comprising:
   comparing, by processing circuitry, ascertained lateral distances from objects to a predetermined usable width of the street section; and
   ascertaining, by the processing circuitry, the parking area based on the comparison.

2. The method of claim 1, wherein the method is performed according to an algorithm by which an apparent parking area ascertained on the basis of a double-parked vehicle is discarded, based on a deviation in a predefined manner of the ascertained lateral distances from the usable width.

3. The method of claim 1, wherein the method is performed according to an algorithm by which an apparent parking area ascertained on the basis of an on-coming vehicle is discarded, based on a deviation in a predefined manner of the ascertained lateral distances from the usable width.

4. The method of claim 1, wherein objects are ascertained from the ascertained lateral distances.

5. The method of claim 4, wherein the objects are vehicles.

6. The method of claim 1, wherein the processing circuitry is at least partly located in an ascertaining vehicle driving on the street section.

7. The method of claim 1, wherein the processing circuitry is at least partly located in a server remote from an ascertaining vehicle for which the parking area is ascertained.

8. The method of claim 1, wherein the ascertaining of the parking area is carried out in real time while the street section is being driven, the ascertained lateral distances being ascertained while the street section is being driven.

9. The method of claim 1, wherein the ascertaining of the parking area is carried in an evaluation phase after the ascertained lateral distances are ascertained from a driving on the street section.

10. The method of claim 1, wherein the lateral distances are ascertained by an ascertaining vehicle based on detections of a sensor of the ascertaining vehicle while the ascertaining vehicle is driving on the street section.

11. The method of claim 10, wherein a maximum range of a total of the lateral distances which the ascertaining vehicle can ascertain is 2* a maximum range of the sensor +a width of the ascertaining vehicle.

12. The method of claim 11, wherein the method further comprises, in an event that the maximum range does not cover the entire usable width, detecting a position of the ascertaining vehicle, and using the detected position.

13. The method of claim 1, wherein the lateral distances are ascertained by an ascertaining vehicle.

14. The method of claim 1, wherein the predetermined width is a drivable width of the street section between parked vehicles.

15. The method of claim 1, wherein the parking area is ascertained in response to satisfaction of a condition that one or more of the ascertained lateral distances is greater than the predetermined usable width.

16. The method of claim 1, further comprising ascertaining the lateral distances based on a correlation between sensed distances obtained by one or more sensors traveling in opposite directions.

17. The method of claim 1, further comprising ascertaining the lateral distances, wherein the ascertaining of the lateral distances includes averaging a plurality of distance measurements of a corresponding plurality of locations.

18. The method of claim 1, further comprising ascertaining the lateral distances, wherein the ascertaining of the lateral distances includes averaging a plurality of distance measurements of a particular location.

19. The method of claim 18, wherein the plurality of distance measurements are obtained during a corresponding plurality of drives by the particular location.

20. An ascertaining vehicle comprising:
an ascertainment device that includes:
a sensor for ascertaining lateral distances from objects; and
circuitry using which:
the ascertained lateral distances are compared to a predetermined usable width of a street section; and
a parking area of the street section is ascertained based on the comparison.

21. The ascertaining vehicle of claim 20, further comprising a communication device for transmitting data of the ascertainment device to a server facility.

22. The ascertaining vehicle device of claim 20, wherein the sensor is an ultrasonic sensor or a radar sensor.

23. A non-transitory computer-readable medium on which are stored instructions that are executable by a computer processor and that, when executed by the processor, cause the processor to perform a method for ascertaining a parking area of a street section, the method comprising:
obtaining lateral distances from objects;
comparing the ascertained lateral distances to a predetermined usable width of the street section; and
ascertaining the parking area based on the comparison.

24. A server comprising:
an interface to a communication network; and
processing circuitry, wherein the processing circuitry is configured to:
obtain, from a vehicle, over the communication network, and via the interface, lateral distances from objects;
compare the obtained lateral distances to a predetermined usable width of a street section; and
ascertain, based on the comparison, a parking area of the street section.

* * * * *